United States Patent
Clos

(10) Patent No.: US 11,628,953 B2
(45) Date of Patent: Apr. 18, 2023

(54) TROLLEY SYSTEM AND METHOD FOR TRANSFERRING CARGO IN RELATION TO A CARGO COMPARTMENT OF A VEHICLE

(71) Applicant: THE BOEING COMPANY, Chicago, IL (US)

(72) Inventor: William Robert Clos, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/706,710

(22) Filed: Mar. 29, 2022

(65) Prior Publication Data

US 2022/0219836 A1 Jul. 14, 2022

Related U.S. Application Data

(62) Division of application No. 16/827,861, filed on Mar. 24, 2020, now Pat. No. 11,332,263.

(51) Int. Cl.
*B62B 1/20* (2006.01)
*B64F 1/32* (2006.01)
*B65G 13/11* (2006.01)
*B65G 67/00* (2006.01)

(52) U.S. Cl.
CPC .............. *B64F 1/324* (2020.01); *B65G 13/11* (2013.01); *B65G 67/00* (2013.01); *B65G 2814/0398* (2013.01)

(58) Field of Classification Search
None
See application file for complete search history.

(56) References Cited

U.S. PATENT DOCUMENTS

| | | | | | |
|---|---|---|---|---|---|
| 2,727,751 | A * | 12/1955 | Souris | ..................... | B62B 1/208 280/653 |
| 3,035,847 | A * | 5/1962 | Born | ..................... | B62B 1/208 280/654 |
| 3,606,371 | A * | 9/1971 | Rousseau et al. | ...... | B62B 1/264 280/47.24 |
| 3,948,538 | A * | 4/1976 | Hovila | .................... | B60B 33/08 280/43.23 |
| 4,108,455 | A * | 8/1978 | James | .................... | B65D 19/42 280/43.23 |
| 4,215,877 | A * | 8/1980 | Pritchett | ................. | B62B 1/208 403/291 |
| 4,504,071 | A * | 3/1985 | Drummond | ............. | B62B 5/025 280/47.27 |

(Continued)

FOREIGN PATENT DOCUMENTS

JP 3378867 B2 * 12/2002
RU 2668012 C1 * 9/2018

*Primary Examiner* — Joseph A Dillon, Jr.
(74) *Attorney, Agent, or Firm* — The Small Patent Law Group LLC; Joseph M. Butscher

(57) ABSTRACT

A trolley system for transferring cargo in relation to a cargo compartment of a vehicle includes a frame defining a cargo-retaining platform. The cargo-retaining platform is configured to receive and retain the cargo. At least a portion of a lower surface of the frame is formed of a low friction material. One or more handles are moveably coupled to the frame. The handle(s) are configured to be moved between a retracted position and an extended position. One or more attachments are configured to secure the cargo on the cargo-retaining platform.

20 Claims, 7 Drawing Sheets

(56) References Cited

U.S. PATENT DOCUMENTS

| | | | | |
|---|---|---|---|---|
| 4,550,931 | A * | 11/1985 | Ziaylek, Jr. | A45C 13/262 280/655 |
| 4,618,157 | A * | 10/1986 | Resnick | B62B 13/18 280/43.1 |
| 4,705,280 | A * | 11/1987 | Burns | B62B 1/208 280/655 |
| 4,790,559 | A * | 12/1988 | Edmonds | B62B 1/208 280/655 |
| 4,846,493 | A * | 7/1989 | Mason | A45C 5/146 280/655 |
| 5,014,935 | A * | 5/1991 | Dalbera | B64C 1/22 244/137.1 |
| 5,184,366 | A * | 2/1993 | Rawdon | B64C 1/22 414/535 |
| 5,294,137 | A * | 3/1994 | Barber | B65F 1/1468 220/4.04 |
| 5,346,245 | A * | 9/1994 | Budrow | B60D 1/155 280/655 |
| 5,806,868 | A * | 9/1998 | Collins | B62B 1/264 280/655 |
| 5,971,410 | A * | 10/1999 | Nichols | B62B 1/18 280/47.32 |
| 6,099,023 | A * | 8/2000 | Be | B62B 1/125 280/655 |
| 6,193,265 | B1 * | 2/2001 | Yemini | B62B 1/22 280/653 |
| 6,585,304 | B1 * | 7/2003 | Boozer | B62B 1/208 220/908 |
| 6,764,093 | B2 * | 7/2004 | Allsop | B62B 1/147 220/9.4 |
| 6,938,740 | B2 * | 9/2005 | Gandy | B62B 5/02 280/655 |
| 7,284,763 | B1 * | 10/2007 | King | A45C 13/02 280/47.35 |
| 7,703,795 | B2 * | 4/2010 | Williamson | A01K 97/10 280/652 |
| 7,731,472 | B2 * | 6/2010 | Miller | B64F 1/30 206/335 |
| D671,704 | S * | 11/2012 | Cooper | B62B 5/065 D34/27 |
| 8,490,765 | B2 * | 7/2013 | Lee | A45C 5/146 280/655 |
| 8,613,464 | B2 * | 12/2013 | Blakeman | A45C 5/14 280/30 |
| 8,733,577 | B2 * | 5/2014 | Patterson | A45C 13/262 206/192 |
| 8,770,599 | B1 * | 7/2014 | Kane | F28G 15/02 280/47.24 |
| 8,789,836 | B2 * | 7/2014 | Umbro | B62B 1/14 280/654 |
| 8,876,033 | B2 * | 11/2014 | Winkel | B65H 49/32 242/578.2 |
| 9,073,471 | B1 * | 7/2015 | McIntosh | B65F 1/0073 |
| 9,303,912 | B1 * | 4/2016 | Schalla | F25D 3/06 |
| 10,220,868 | B1 * | 3/2019 | Clos | B62B 3/02 |
| 10,259,479 | B1 * | 4/2019 | Sagherian | B62B 1/208 |
| 10,953,907 | B2 * | 3/2021 | Wilkins | B62B 5/067 |
| 11,008,031 | B1 * | 5/2021 | Coates | A45C 13/02 |
| 11,091,182 | B1 * | 8/2021 | Lwali | B62B 13/18 |
| 11,142,231 | B2 * | 10/2021 | Draleau | B62B 1/12 |
| 2003/0021660 | A1 * | 1/2003 | Wells | B65D 90/18 414/340 |
| 2005/0173896 | A1 * | 8/2005 | Kim | B62B 5/06 280/655 |
| 2007/0215424 | A1 * | 9/2007 | Mittleman | A45C 5/14 280/655 |
| 2009/0160147 | A1 * | 6/2009 | Arthur | B62B 1/22 280/37 |
| 2010/0044983 | A1 * | 2/2010 | Panigot | A47C 4/52 280/40 |
| 2011/0140382 | A1 * | 6/2011 | Scheermesser | B62B 1/12 280/47.131 |
| 2012/0013083 | A1 * | 1/2012 | Pendl | B62B 19/04 280/7.14 |
| 2013/0062843 | A1 * | 3/2013 | Riddiford | A45C 5/14 280/47.26 |
| 2013/0076005 | A1 * | 3/2013 | McDade | B62B 1/20 280/47.26 |
| 2013/0121800 | A1 * | 5/2013 | Hacko | B65D 19/42 280/30 |
| 2015/0115555 | A1 * | 4/2015 | Cates | B62B 5/0089 280/47.26 |
| 2017/0144683 | A1 * | 5/2017 | Moskovsky | B62B 3/002 |
| 2019/0217877 | A1 * | 7/2019 | Webber | B62B 5/068 |
| 2019/0256116 | A1 * | 8/2019 | Milane | B62B 1/008 |
| 2019/0270475 | A1 * | 9/2019 | Wilkins | B62B 13/18 |
| 2020/0247442 | A1 * | 8/2020 | Izzo | B62B 1/008 |
| 2020/0369307 | A1 * | 11/2020 | Dopf | B62B 5/068 |
| 2020/0385038 | A1 * | 12/2020 | McAleenan | B62B 5/067 |
| 2020/0390084 | A1 * | 12/2020 | Edwards | B62B 1/208 |
| 2021/0009176 | A1 * | 1/2021 | Panigot | B62B 1/208 |
| 2021/0086900 | A1 * | 3/2021 | Christoffersson | B60P 1/38 |
| 2021/0107547 | A1 * | 4/2021 | Rivera | B62B 5/00 |

* cited by examiner

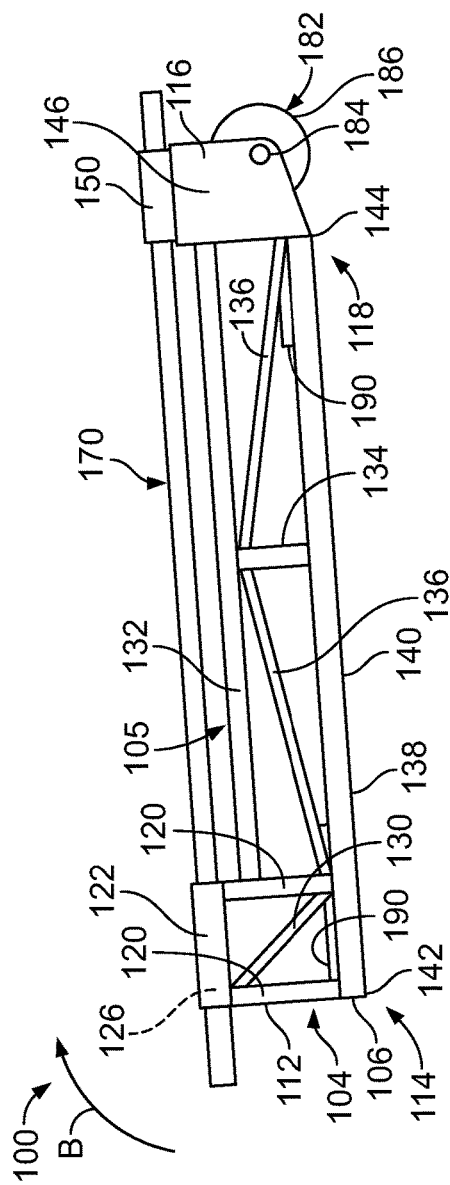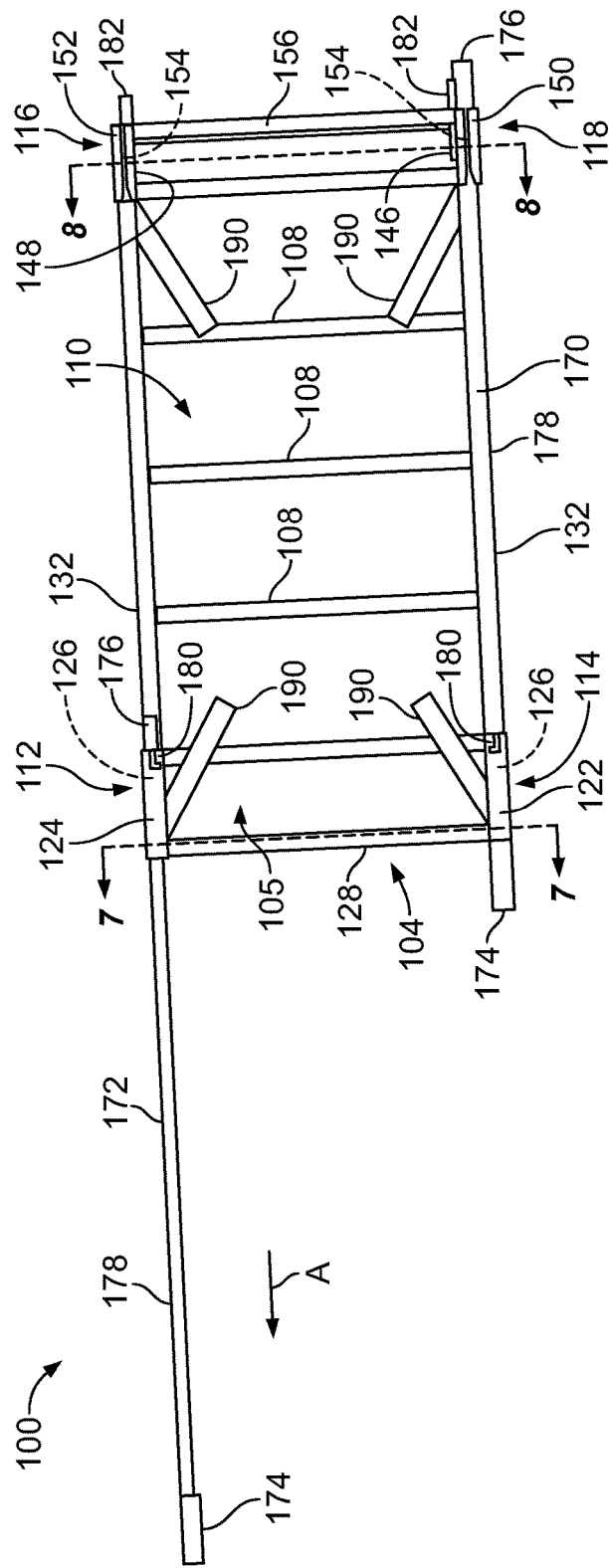

TROLLEY SYSTEM AND METHOD FOR TRANSFERRING CARGO IN RELATION TO A CARGO COMPARTMENT OF A VEHICLE

RELATED APPLICATIONS

This application is a division of U.S. patent application Ser. No. 16/827,861, entitled "Trolley System and Method for Transferring Cargo in Relation to a Cargo Compartment of a Vehicle," filed Mar. 24, 2020, now U.S. Pat. No. 11,332,263, which is hereby incorporated by reference in its entirety.

FIELD OF THE DISCLOSURE

Embodiments of the present disclosure generally relate to a trolley system and method, and more particularly to a trolley system and method for transferring cargo in relation to a cargo compartment of a vehicle, such as a commercial aircraft.

BACKGROUND OF THE DISCLOSURE

Commercial aircraft are used to transport passengers between various locations. Certain persons of reduced mobility (such as individuals having disabilities, injuries, or a reduced ability to move) may use a wheelchair or scooter. When such individuals travel, their wheelchairs or scooters may be stored in a cargo compartment of the aircraft.

Typically, items such as powered wheelchairs or scooters are pushed, carried, or driven between a terminal or gate of an airport, and a cargo belt loader. Once at the cargo belt loader, such items are lifted onto the cargo belt loader, which then conveys the items toward and into a cargo compartment of the aircraft. Once within the cargo compartment, the items are typically pushed or slid into a secure retaining area.

As can be appreciated, the process of transferring large cargo items, such as powered wheelchairs and scooters, into and out of a cargo compartment of an aircraft is time-consuming. Further, such process is labor intensive, and may cause discomfort to individuals loading and unloading the large and heavy cargo items into and out of the cargo compartment. Moreover, the individuals that load and unload cargo items such as powered wheelchairs and scooters into and out of the cargo compartment may not be fully aware of how to operate such items. As such, the process of loading and unloading powered wheelchairs and scooters into and out of a cargo compartment may undesirably affect operation of such items, such as if brakes are not properly operated.

SUMMARY OF THE DISCLOSURE

A need exists for a system and a method for efficiently, effectively, and safely transferring large cargo items, such as powered wheelchairs and scooters, in relation to a cargo compartment of a vehicle, such as a commercial aircraft.

With those needs in mind, certain embodiments of the present disclosure provide a trolley system for transferring cargo in relation to a cargo compartment of a vehicle. The trolley system includes a frame defining a cargo-retaining platform. The cargo-retaining platform is configured to receive and retain the cargo. At least a portion of a lower surface of the frame is formed of a low friction material. One or more handles are moveably coupled to the frame. The handle(s) are configured to be moved between a retracted position and an extended position. One or more attachments are to secure the cargo on the cargo-retaining platform.

In at least one embodiment, the frame includes a retaining pan configured to be positioned underneath the cargo.

As an example, the handle(s) include a first grasping portion, and a second grasping portion. The first grasping portion and the second grasping portion outwardly extend from the frame when the handle(s) are in the retracted position.

In at least one embodiment, the frame includes low friction pads that are formed of the low friction material.

In at least one embodiment, the frame further includes a chamfered first lower edge at a first end, and a chamfered second lower edge at a second end that is opposite from the first end.

In at least one embodiment, one or more rollers are coupled to the frame. The roller(s) are configured to allow the trolley system to be rolled. As an example, lower surfaces of the roller(s) are within a plane that is above or coplanar with the lower surface of the frame.

In at least one embodiment, the handle(s) in the extended position allow the trolley system to be upwardly pivoted about an axis of the roller(s) so that the roller(s) directly contact a floor and allow the trolley system to be rolled via the roller(s).

As an example, the attachment(s) may include one or more straps.

Certain embodiments of the present disclosure provide a method for transferring cargo in relation to a cargo compartment of a vehicle. The method includes retaining cargo on a cargo-retaining platform of a frame of a trolley system; securing the cargo on the cargo-retaining platform with one or more attachments coupled to the frame; moving one or more handles coupled to the frame between a retracted position and an extended position; and sliding a portion of a lower surface of the frame formed of a low friction material over a floor surface.

BRIEF DESCRIPTION OF THE DRAWINGS

FIG. 4 illustrates a lateral view of the trolley system, according to an embodiment of the present disclosure.

FIG. 5 illustrates a top view of the trolley system of FIG. 4.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a trolley system for transferring large cargo items, such as powered wheelchairs and scooters, in relation to a cargo compartment of a vehicle, such as a commercial aircraft. The trolley system is configured to provide efficient, safe, fast, and effective transfer of cargo in relation to (for example, into and out of) the cargo compartment. The trolley system allows for quick and easy transfer of the cargo between an airport terminal or gate and the cargo compartment, for example.

In at least one embodiment, the trolley system includes a frame, attachments for securing cargo to the frame, extendable handles, and low friction material on at least one surface for easy sliding within a cargo compartment. One or more wheels are coupled to the frame to allow for rolling transfer of the cargo, such as between a gate and a cargo loader.

In at least one embodiment, a method for handling cargo includes using a trolley system to transport the cargo. Said using includes securing the cargo to the trolley, lifting the trolley with extendable handles, and sliding the trolley system within a cargo compartment of a vehicle. Said sliding is accomplished via a low friction material on at least one surface of the trolley system.

Embodiments of the present disclosure provide safe, fast, and damage-free handling of cargo (such as powered wheelchairs, scooters, large baggage, appliances, packaged goods, and/or the like) between a first area, such as an airport terminal or gate, and a second area, such as a cargo compartment of an aircraft. The trolley system provides a low-cost and lightweight structure, which reduces costs to vehicle operators (for example, costs associated with labor of transferring cargo, potential damage to cargo, and the like). Further, the trolley system improves passenger experience and travel mobility options, such as for persons of reduced mobility who prefer and/or need to travel with powered wheelchairs or scooters.

Figure 1:
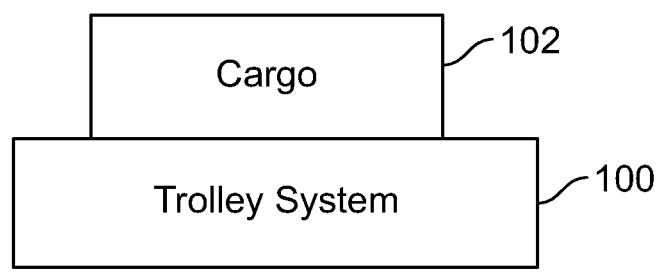
FIG. 1 illustrates a block diagram of a trolley system supporting cargo, according to an embodiment of the present disclosure.

FIG. 1 illustrates a block diagram of a trolley system 100 supporting cargo 102, according to an embodiment of the present disclosure. The trolley system 100 is configured to transfer the cargo 102 between a first area, such as a terminal or gate of an airport, and a second area, such as a cargo compartment of a vehicle, such as a commercial aircraft. Examples of the cargo 102 include a wheelchair (whether powered or unpowered), a powered scooter, large and/or multiple items of baggage, one or more packaged goods, one or more appliances, and/or the like.

Figure 2:
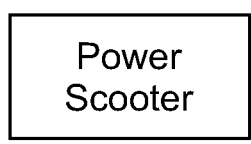
FIG. 2 illustrates a block diagram of a power scooter.
Figure 3:
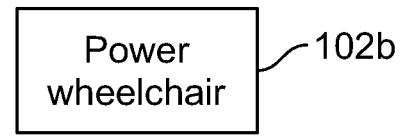
FIG. 3 illustrates a block diagram of a power wheelchair.

FIG. 2 illustrates a block diagram of a power scooter 102a. FIG. 3 illustrates a block diagram of a power wheelchair 102b. Referring to FIGS. 2 and 3, the power scooter 102a and the power wheelchair 102b are examples of the cargo 102, shown in FIG. 1. The power scooter 102a and the power wheelchair 102b are used by persons of reduced mobility. Referring to FIGS. 1-3, the trolley system 100 is configured to quickly, safely, efficiently, and cost-effectively move the cargo 102, such as the power scooter 102a or the power wheelchair 102b, between a first area (for example, a terminal or gate of an airport) and a second area (for example, a cargo compartment of a commercial aircraft). As such, the individual who owns the power scooter 102a or the power wheelchair 102b is able to travel with such item knowing that the item will not be damaged. Further, the trolley system 100 prevents, minimizes, or otherwise reduces potential discomfort or injury to personnel charged with transferring the cargo 102 between the different areas.

Figure 6:
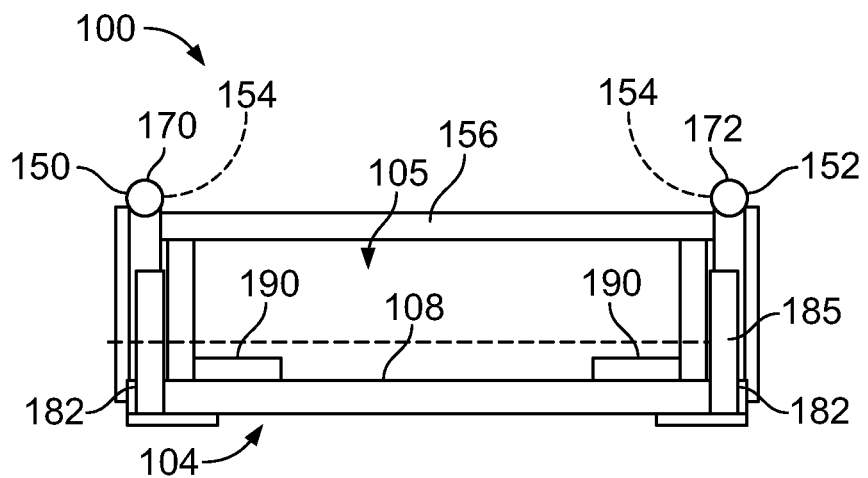
FIG. 6 illustrates an end view of the trolley system of FIG. 4.
Figure 7:
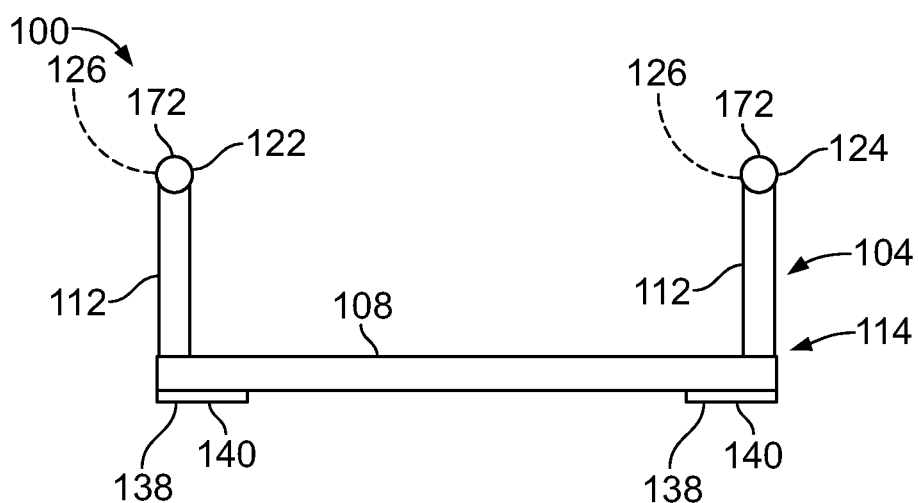
FIG. 7 illustrates a cross-sectional view of the trolley system through line 7-7 of FIG. 5.
Figure 8:
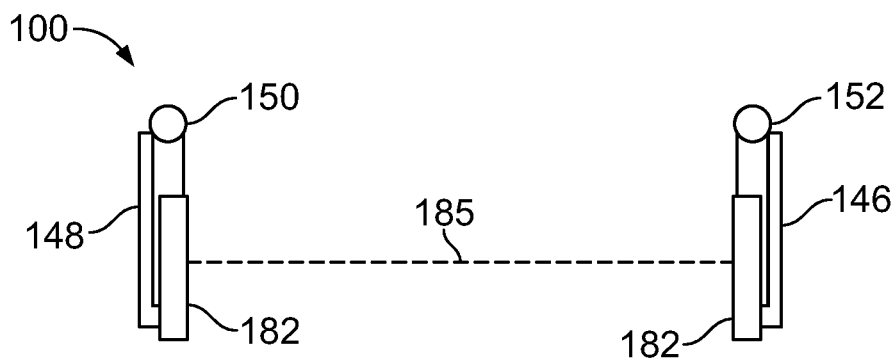
FIG. 8 illustrates a cross-sectional view of the trolley system through line 8-8 of FIG. 5.

FIG. 4 illustrates a lateral view of the trolley system 100, according to an embodiment of the present disclosure. FIG. 5 illustrates a top view of the trolley system 100 of FIG. 4. FIG. 6 illustrates an end view of the trolley system 100 of FIG. 4. FIG. 7 illustrates a cross-sectional view of the trolley system 100 through line 7-7 of FIG. 5. FIG. 8 illustrates a cross-sectional view of the trolley system 100 through line 8-8 of FIG. 5.

Referring to FIGS. 4-8, the trolley system 100 includes a frame 104 that defines a cargo-retaining platform 105. The frame 104 includes lower lateral beams 106, and lower cross beams 108 that connect the lower lateral beams 106 together. For example, the trolley system 100 includes two lower lateral beams 106 connected together by a plurality of lower cross beams 108, which may be orthogonal (for example, perpendicular) to the lower lateral beams 106. The frame 104 may include more or less lower cross beams 108 than shown.

In at least one embodiment, the lower cross beams 108 support a retaining pan 110, such as a metal or plastic panel. The retaining pan 110 is configured to be positioned underneath the cargo 102 (shown in FIG. 1). The retaining pan 110 may be secured over or under the lower cross beams 108 and/or the lower lateral beams 106. Optionally, the frame 104 may include the retaining pan 110 instead of the lower cross beams 108. That is, the retaining pan 110 may connect the lower lateral beams 106 together. The retaining pan 110 is configured to capture and retain stray components (such as fasteners), leaked fluids, and/or the like from the cargo 102 (shown in FIG. 1) supported on the trolley system 100. Alternatively, the trolley system 100 may not include the retaining pan 110.

The frame 104 also includes a first end bracket 112 at a first end 114 and a second end bracket 116 at a second end 118 that is opposite from the first end 114. The first end bracket 112 includes one or more upright beams 120 that upwardly extend from the lower lateral beams 106. The upright beams 120 may be perpendicular to the lower lateral beams 106. For example, the upright beams 120 may be vertical beams, and the lower lateral beams 106 may be horizontal beams. The upright beams 120 on one side connect to a first handle retainer 122 and the upright beams 120 on an opposite side connect to a second handle retainer 124. Each handle retainer 122 and 124 includes a central passage 126. One or more upper cross beams 128 may connect the upright beams 120 on opposite sides of the trolley system 100 together. Additionally, angled bracing struts 130 may connect to the upright beams 120 on one or both sides of the trolley system 100 to provide additional supporting strength.

The frame 104 may also include upper lateral beams 132 on each side of the trolley system 100. The upper lateral beams 132 are parallel to the lower lateral beams 106 and are coupled to, and span between, the first end bracket 112 and the second end bracket 116. Lateral upright beams 134 and angled bracing struts 136 may extend between the lower cross beam 106 and the upper cross beam 132 on one or both sides of the trolley system 100.

A lower surface 138 of the frame 104, such as lower surfaces of the lower lateral beams 106, the lower cross beams 108, and/or the retaining pan 110 may be formed with or otherwise coupled to a low friction pad(s) 140 formed of a low friction material, such as polyethylene, polyurethane, and/or the like. The low friction pad(s) 140 allows the trolley system 100 to easily slide over surfaces, such as a metal floor within a cargo compartment. In at least one embodiment, a first lower edge 142 at the first end 114 of the frame 104 and a second lower edge 144 at the second end 118 of the frame 104 are chamfered and/or rounded, blunted, or the like. The chamfered first lower edge 142 and the chamfered second lower edge 144 further facilitate easy sliding of the trolley system 100 over a surface. The chamfered first lower edge 142 and the chamfered second lower edge 144 prevent, minimize, or otherwise reduce a potential of the lower surface 138 catching or snagging on other components within an area. Alternatively, one or both of the first lower edge 142 and/or the second lower edge 144 may not be chamfered.

The second end bracket 116 includes lateral panels 146 and 148 that upwardly extend from the lower lateral beams 106 at the second end 118. The lateral panel 146 connect to a third handle retainer 150 and the lateral panel 148 connects to a fourth handle retainer 152. Each handle retainer 150 and 162 includes a central passage 154. One or more upper cross beams 156 may connect the lateral panels 146 and 148 together.

The first handle retainer 122 is coaxial with the third handle retainer 150. The second handle retainer 124 is coaxial with the fourth handle retainer 152. As shown, the first handle retainer 122 is spaced apart from the third handle retainer 150, and the second handle retainer 124 is spaced apart from the fourth handle retainer 152. Optionally, a single handle retainer may extend along a side of the trolley system 100 between the first end 114 and the second end 118.

The first handle retainer 122 and the third handle retainer 150 cooperate to retain a first handle 170 and the second handle retainer 124 and the fourth handle retainer 152 cooperate to retain a second handle 172. Each of the first handle 170 and the second handle 172 include a first end grasping portion 174 connected to a second end grasping portion 176 by a main longitudinal body 178. The first handle 170 and the second handle 172 are configured to be moved between a retracted position, as shown in FIG. 4, and an extended position. FIG. 5 shows the first handle 170 in the retracted position, and the second handle 172 in the extended position.

In the retracted position, the first grasping portions 174 extend outwardly from the first handle retainer 122 and the second handle retainer 124, and the second grasping portions 176 extend outwardly from the third handle retainer 150 and the fourth handle retainer 152. As such, when both the first handle 170 and the second handle 172 are in the retracted position, four grasping areas, namely two first grasping portions 174 at the first end 114 and two grasping portions 176 at the second end 118, are readily apparent and available for use. In this manner, the trolley system 100 having the first handle 170 and the second handle 172 in the retracted positions may be carried by four individuals (such as an individual at each corner), allowing the weight of the cargo 102 supported on the trolley system 100 to be distributed among the four individuals, thereby reducing muscle stress and strain (as compared to if a single individual attempted to move the cargo 102).

In order to provide leverage, the first handle 170 and the second handle 172 are slid into the extended positions, outwardly from the first end 114 in the direction of arrow A. In the extended positions, the second grasping portions 176 are slid inwardly and toward the first end 114, thereby no longer extending outwardly from the second end 118. Stop members 180 are disposed within the first handle retainer 122 and the second handle retainer 124. The stop members 180 may be detents, latches, clasps, barbs, and/or the like that are configured to prevent the first grasping portions 176 from passing entirely through and out of the first handle retainer 122 and the second handle retainer 124.

In at least one embodiment, rollers 182 (such as polyurethane wheels) are rotatably coupled to the second end 118. For example, a roller 182 is rotatably coupled to the first panel 146 via an axle 184, and a roller 182 is rotatably coupled to the second panel 148 via an axle 184. As shown in FIG. 4, lower surfaces 186 of the rollers 182 may be within a plane that is above or coplanar with the lower surface 138 of the trolley system 100. As such, when the trolley system 100 lies flat on a surface, the trolley system 100 is not susceptible to inadvertently rolling via the rollers 182.

When the first handle 170 and the second handle 172 are moved into the extended positions, the trolley system 100 may be pivoted upwardly in the direction of arc B about the rollers 182, so that the rollers 182 directly touch a floor surface without the lower surface 138 touching the floor surface. In this manner, an individual may upwardly pivot the trolley system 100 about an axis 185 defined by the axles 184, and roll the trolley system 100 (and cargo 102 secured to the trolley system 100) via the rollers 182. Alternatively, the trolley system 100 may not include the rollers 182.

One or more attachments 190 are secured to the frame 104. In at least one embodiment, the attachments 190 are straps, ropes, cords, tie-downs, hook and loops fasteners, and/or the like. As shown, the trolley system 100 may include four attachments 190, with each corner having an attachment 190. The attachments 190 may be secured to the lower lateral beams 106 and/or one or more of the lower cross beams 108. Optionally, the attachments 190 may be secured to other beams. Further, the trolley system 100 can include more attachments 190 than shown. As another example, the trolley system 100 includes less than four attachments 190, such as one, two, or three attachments 190.

Referring to FIGS. 1-8, the trolley system 100 is configured to transfer the cargo 102 in relation to a cargo compartment of a vehicle. The trolley system 100 includes the frame 104 defining the cargo-retaining platform 105. The cargo-retaining platform 105 is configured to receive and retain the cargo 102. At least a portion of the lower surface 138 of the frame 104 is formed of a low friction material. One or more handles (such as the first handle 170 and/or the second handle 172) are moveably coupled to the frame 104. The handle(s)s are configured to be moved between a retracted position and an extended position. One or more attachments 190 (such as one or more straps) are configured to secure the cargo 102 on the cargo-retaining platform 105.

In at least one embodiment, the frame 104 includes the retaining pan 100, which is configured to be positioned underneath the cargo 102.

In at least one embodiment, the handle(s) 104 include a first grasping portion 174, and a second grasping portion 176. The first grasping portion 174 and the second grasping portion 176 outwardly extend from the frame 104 when the handle(s) are in the retracted position.

In at least one embodiment, the frame 104 includes low friction pads 140 that are formed of the low friction material. In at least one embodiment, the frame 104 further includes a chamfered first lower edge 142 at the first end 114, and a chamfered second lower edge 144 at the second end 118 that is opposite from the first end 114.

In at least one embodiment, one or more rollers 182 are coupled to the frame 104. The roller(s) 182 are configured to allow the trolley system 100 to be rolled. In at least one embodiment, one or more lower surfaces 186 of the roller(s) 184 are within a plane that is above or coplanar with the lower surface 138 of the frame 104. The handle(s) in the extended position allow the trolley system 100 to be upwardly pivoted about the axis 185 of the roller(s) 184 so that the roller(s) 184 directly contact a floor and allow the trolley system 100 to be rolled via the roller(s) 184.

Figure 9:
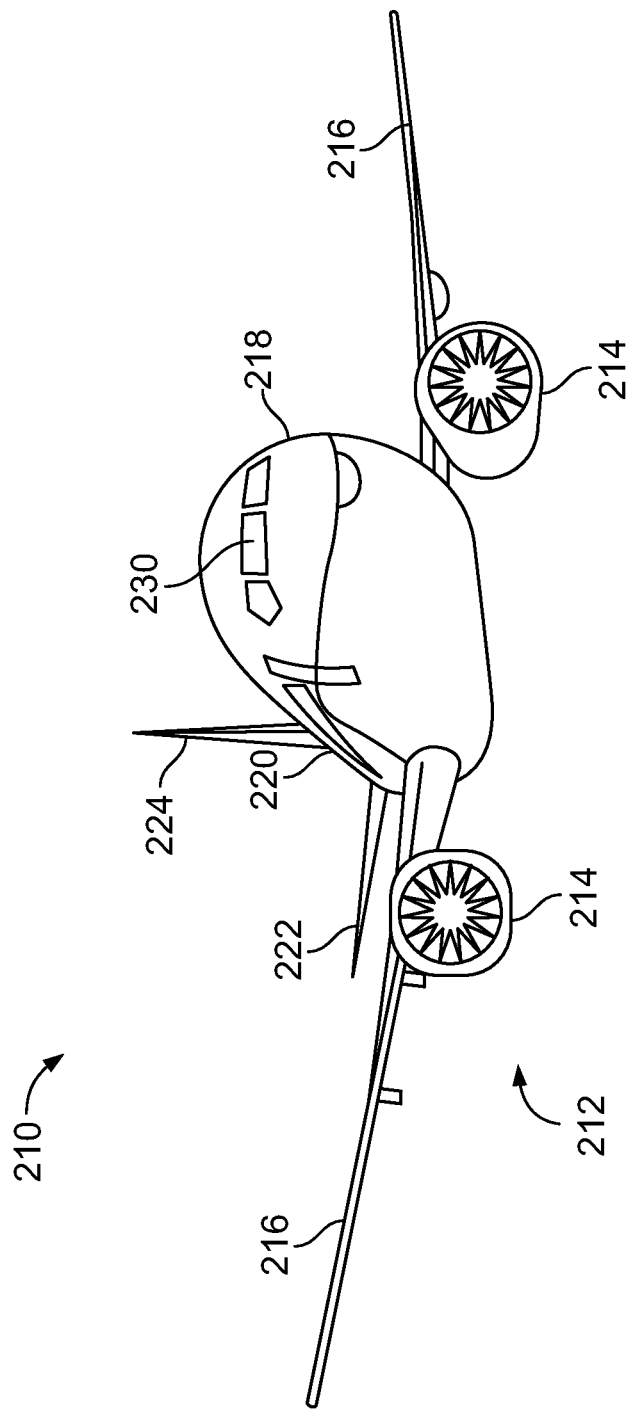
FIG. 9 illustrates a perspective front view of an aircraft, according to an embodiment of the present disclosure.

FIG. 9 illustrates a perspective front view of an aircraft 210, according to an embodiment of the present disclosure. The aircraft 210 includes a propulsion system 212 that includes engines 214, for example. Optionally, the propulsion system 212 may include more engines 214 than shown. The engines 214 are carried by wings 216 of the aircraft 210. In other embodiments, the engines 214 may be carried by a fuselage 218 and/or an empennage 220. The empennage 220 may also support horizontal stabilizers 222 and a vertical stabilizer 224.

The fuselage 218 of the aircraft 210 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. The aircraft 210 further includes a cargo compartment. Referring to FIGS. 1-9, the trolley system 100 is used to transfer the cargo 102 in relation to the cargo compartment when the aircraft 210 is on the ground and parked at a gate, for example.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

Figure 10:
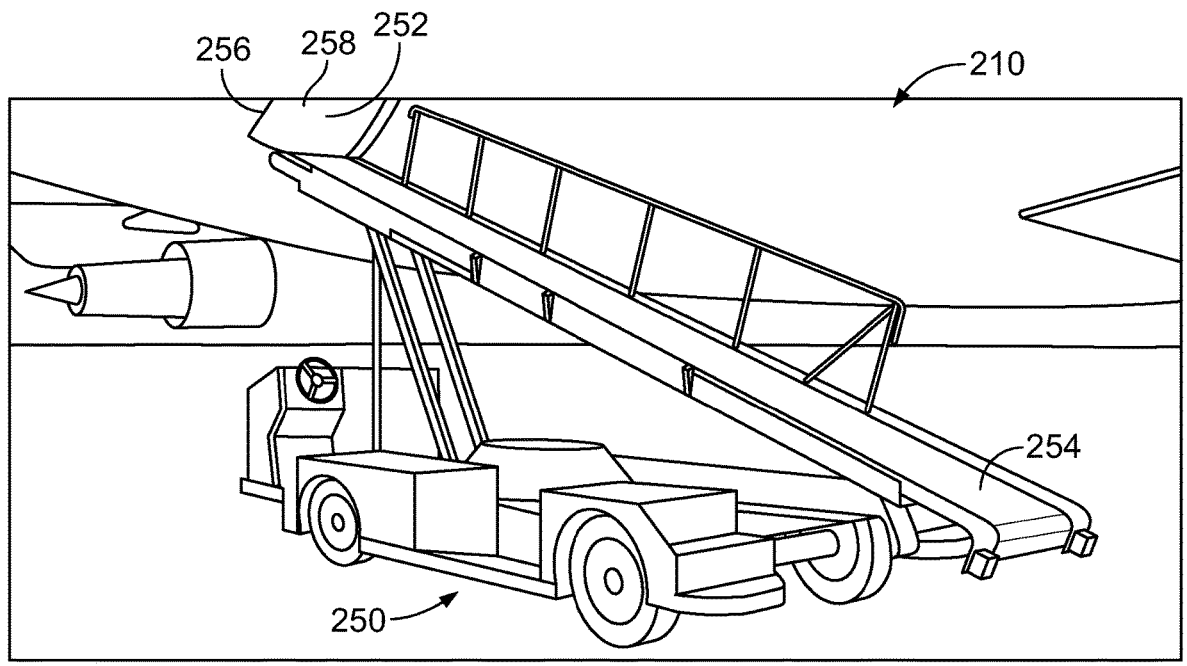
FIG. 10 illustrates a perspective lateral view of a cargo loader proximate to a cargo compartment of the aircraft, according to an embodiment of the present disclosure.

FIG. 10 illustrates a perspective lateral view of a cargo loader 250 proximate to a cargo compartment 252 of the aircraft, according to an embodiment of the present disclosure. The cargo loader 250 includes a conveyor 254 that leads into the cargo compartment 252. A distal end 256 of the conveyor 254 abuts against or into an entrance 258 of the cargo compartment 252 when a door of the cargo compartment 252 is opened, as in FIG. 10.

Referring to FIGS. 1-10, the cargo 102 is secured to the trolley system 100, which is loaded onto the conveyor 254. The conveyor 254 then moves the trolley system 100, which supports the cargo 102, into the cargo compartment 252. The trolley system 100 ensures that the cargo 102, such as a power wheelchair, is quickly and safely moved into the cargo compartment 252. If the trolley system 100 was not used, individuals may find it difficult to grasp and lift the power wheelchair onto the conveyor 254. Moreover, supporting the power wheelchair directly on the conveyor 254 risks damage to the power wheelchair, as the wheels of the power wheelchair may cause it to inadvertently roll off the conveyor 254.

Figure 11:
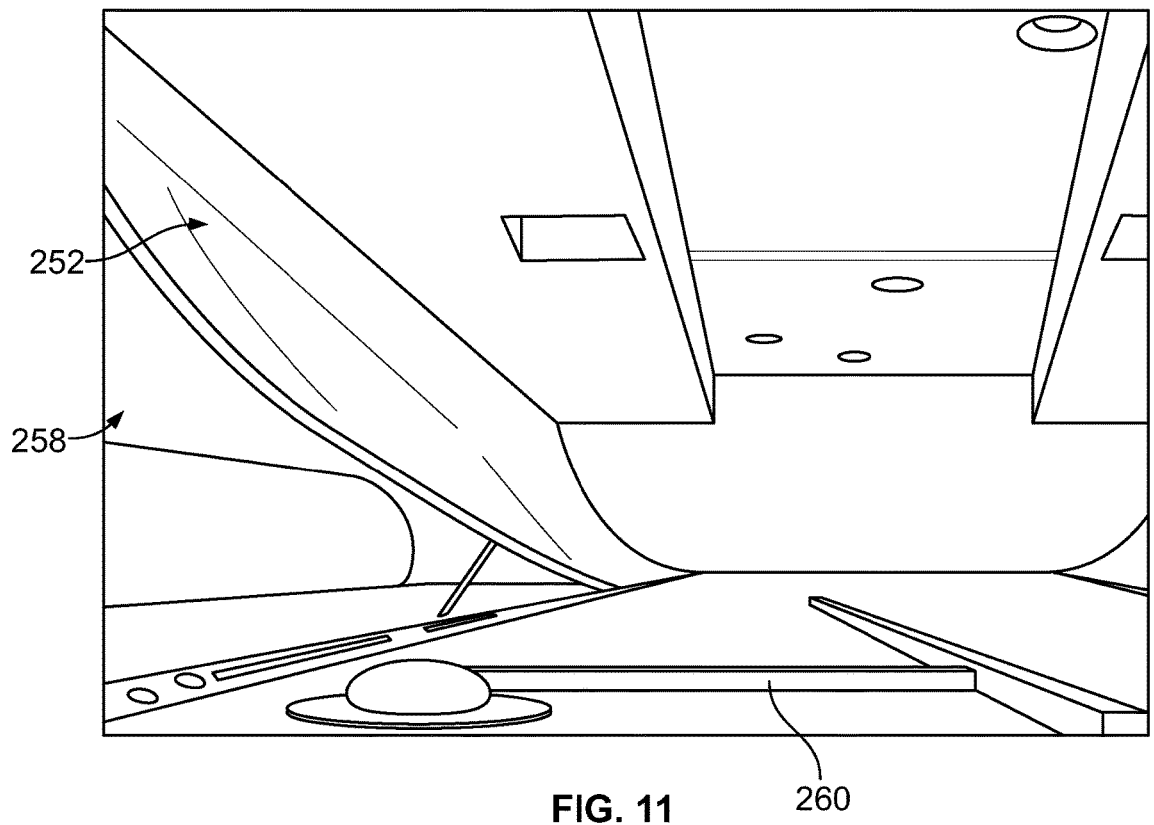
FIG. 11 illustrates a perspective internal view of the cargo compartment, according to an embodiment of the present disclosure.

FIG. 11 illustrates a perspective internal view of the cargo compartment 252, according to an embodiment of the present disclosure. The cargo compartment 252 includes a floor surface 260. Referring to FIGS. 1-11, the trolley system 100 is configured to be slid over the floor surface 260.

If the trolley system 100 was not used, a power wheelchair may be difficult to move within the cargo compartment 252, due to the confined space therein. Moreover, personnel would likely need to know how to disengage brakes of the power wheelchair in order to roll it to a desired location. Further, sliding a power wheelchair requires overcoming frictional resistance between its rubber wheels and the floor surface 260.

Figure 12:
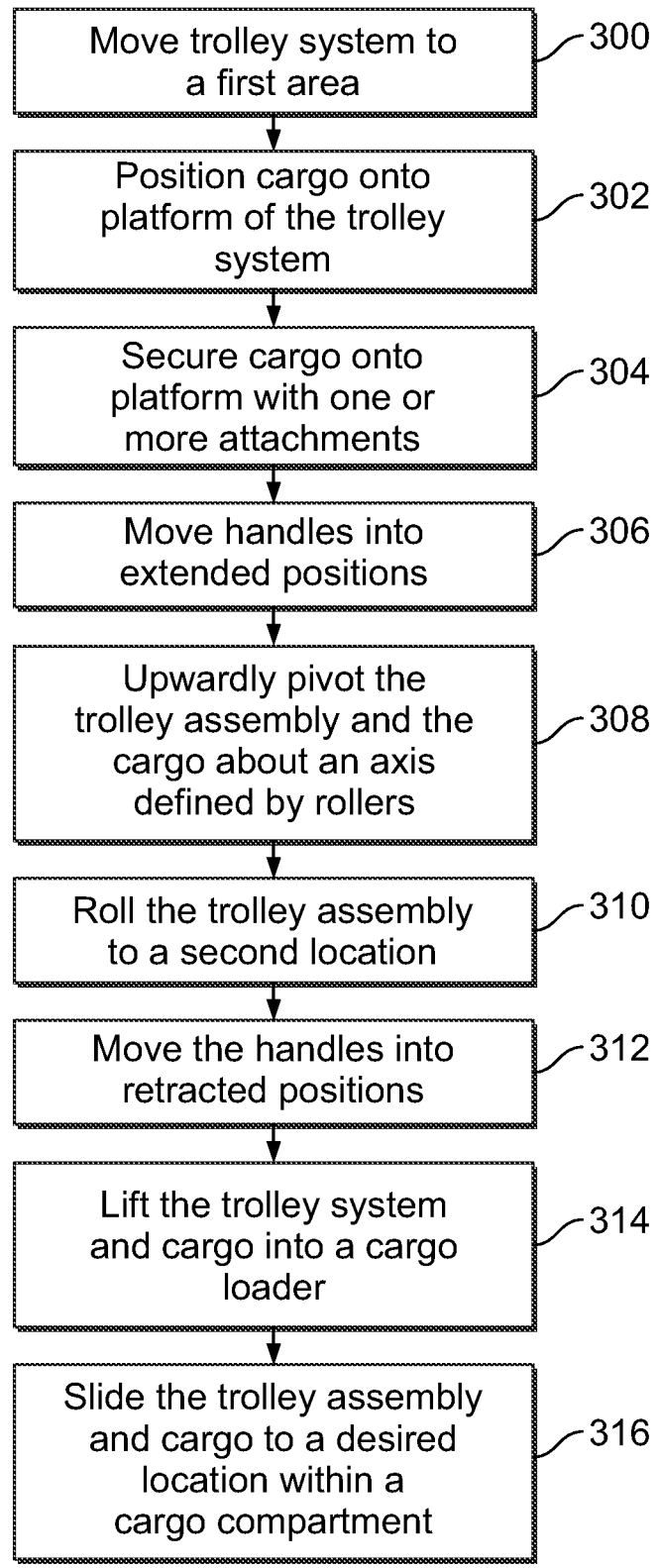
FIG. 12 illustrates a flow chart of a method of transferring cargo, according to an embodiment of the present disclosure.

FIG. 12 illustrates a flow chart of a method of transferring cargo, according to an embodiment of the present disclosure. Referring to FIGS. 1-12, at 300, the trolley system 100 is moved to a first area, such as at a gate, terminal, or other area where the cargo 102 is located. At 302, the cargo 102 is then positioned onto the cargo-retaining platform 105 of the trolley system 100. For example, if the cargo 102 is a wheelchair or a scooter, such items may be driven onto the platform 105. Optionally, the cargo 102 may be lifted onto the cargo-retaining platform 105.

At 304, the cargo 102 is secured onto the cargo-retaining platform 105 with one or more attachments 190. For example, the attachments 190 may be tied around portions of the cargo 102 to secure the cargo 102 to the cargo-retaining platform 105.

At 306, the handles 170 and 172 may be moved into extended positions. At 308, the trolley assembly 100, which supports the cargo 102, can be upwardly pivoted with the handles 170 and 172 in the extended positions about the axis 185 defined by the rollers 182. Then, at 310, the trolley assembly 100, which supports the cargo 102, can be rolled and/or otherwise moved to a second location, such as proximate to the cargo loader 250.

At 312, the handles 170 and 172 are moved into the retracted positions, so as to provide the grasping portions 174 and 176 extending from the ends 114 and 118. At 314, individuals may then grasp the grasping portions 174 and 176 and lift the trolley system 100, which supports the cargo 102, onto the conveyor 254 of the cargo loader 250. The conveyor 254 moves the trolley system 100 into the cargo compartment 252. At 316, the trolley system 100, which supports the cargo 102, is then slid to a desired location within the cargo compartment 252. In order to remove the trolley system 100 and the cargo 102 from the cargo compartment 252 to a different area (such as a gate of an airport), the method is reversed.

Figure 13:
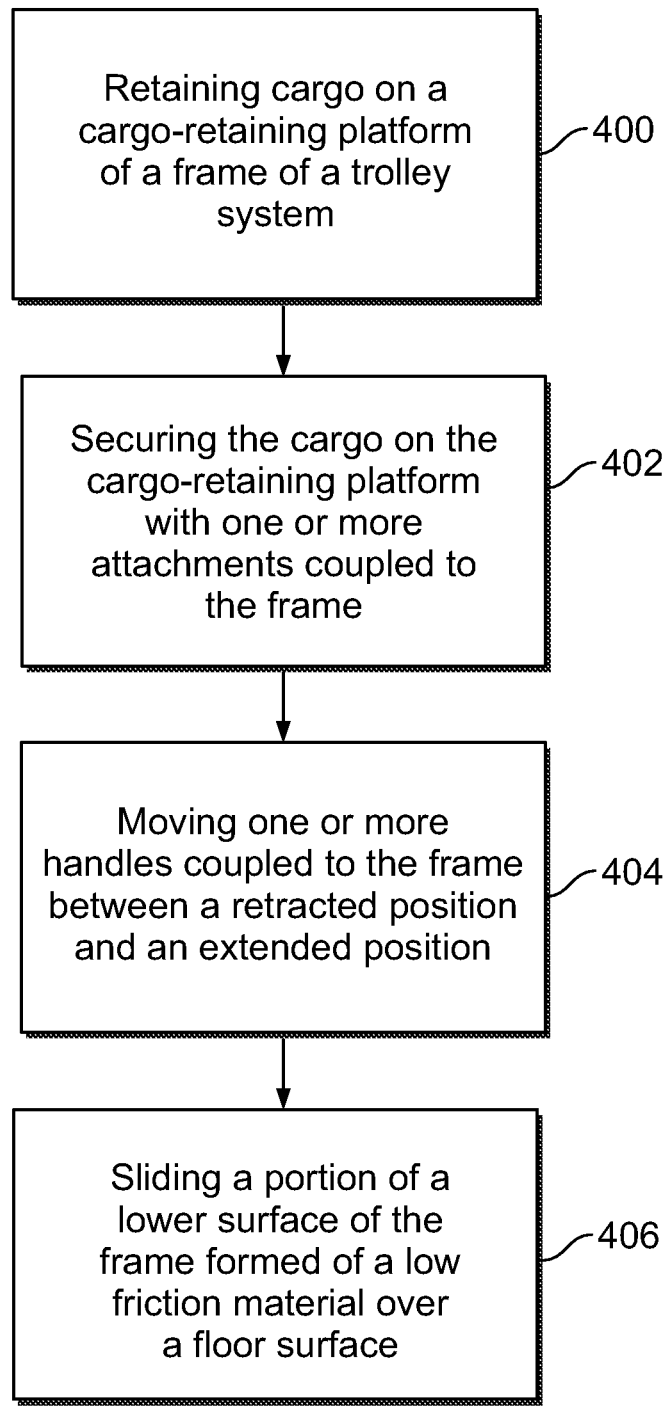
FIG. 13 illustrates a flow chart of a method of transferring cargo in relation to a cargo compartment of a vehicle, according to an embodiment of the present disclosure.

FIG. 13 illustrates a flow chart of a method for transferring cargo in relation to a cargo compartment of a vehicle. The method includes retaining (400) cargo2 on a cargo-retaining platform of a frame of a trolley system; securing (402) the cargo on the cargo-retaining platform with one or more attachments coupled to the frame; moving (404) one or more handles coupled to the frame between a retracted position and an extended position; and sliding (406) a portion of a lower surface of the frame formed of a low friction material over a floor surface.

As an example, the method also includes positioning a retaining pan of the frame underneath the cargo.

As an example, said moving includes outwardly extending a first grasping portion and a second grasping portion of the one or more handles from the frame when the handles are in the retracted position.

As an example, the method also includes rolling the trolley system via one or more rollers coupled to the frame.

As an example, the method also includes upwardly pivoting the trolley system, by the one or more handles in the extended position, so that the one or more rollers directly contact a floor.

As described herein, embodiments of the present disclosure provide a system and a method for efficiently, effectively, and safely transferring large cargo items, such as powered wheelchairs and scooters, in relation to a cargo compartment of a vehicle, such as a commercial aircraft.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for transferring cargo in relation to a cargo compartment of a vehicle, the method comprising:
    positioning a retaining pan of a frame of a trolley system underneath the cargo;
    retaining the cargo on a cargo-retaining platform of the frame;
    securing the cargo on the cargo-retaining platform with one or more attachments coupled to the frame;
    moving one or more handles coupled to the frame between a retracted position and an extended position; and
    sliding a portion of a lower surface of the frame formed of a low friction material over a floor surface.

2. The method of claim 1, wherein said moving comprises outwardly extending a first grasping portion and a second grasping portion of the one or more handles from the frame when the handles are in the retracted position.

3. The method of claim 1, further comprising rolling the trolley system via one or more rollers coupled to the frame.

4. The method of claim 3, wherein lower surfaces of the one or more rollers are within a plane that is above or coplanar with the lower surface of the frame.

5. The method of claim 3, further comprising upwardly pivoting the trolley system via the one or more handles in the extended position about an axis of the one or more rollers so that the one or more rollers directly contact a floor and allow the trolley system to be rolled via the one or more rollers.

6. The method of claim 3, further comprising upwardly pivoting the trolley system, by the one or more handles in the extended position, so that the one or more rollers directly contact a floor.

7. The method of claim 1, wherein the frame comprises low friction pads that are formed of the low friction material.

8. The method of claim 1, wherein the frame comprises a chamfered first lower edge at a first end, and a chamfered second lower edge at a second end that is opposite from the first end.

9. The method of claim 1, wherein the one or more attachments comprises one or more straps.

10. The method of claim 1, wherein the frame comprises:
    a first handle retainer at a first side and first end;
    a second handle retainer at a second side and the first end, wherein the second side is opposite from the first side;
    a third handle retainer at the first side and a second end, wherein the second end is opposite from the first end, wherein the first handle retainer is spaced apart from and coaxial with the third handle retainer; and
    a fourth handle retainer at the send side and the second end, wherein the second handle retainer is spaced apart from and coaxial with the fourth handle retainer;
wherein the trolley system further comprises:
    a first handle moveably retained by the first handle retainer and the third handle retainer of the frame, wherein the first handle comprises a first grasping portion and a second grasping portion opposite from the first grasping portion; and
    a second handle moveably retained by the second handle retainer and the fourth handle retainer of the frame, wherein the second handle comprises a third grasping portion and a fourth grasping portion opposite from the third grasping portion, wherein each of the first handle and the second handle is configured to be moved between a retracted position and an extended position, wherein the first grasping portion extends outwardly from the first handle retainer in the retracted position, wherein the second grasping portion extends outwardly from the third handle retainer in the retracted position, wherein the third grasping portion extends outwardly from the second handle retainer in the retracted position, and wherein the fourth grasping portion extends outwardly from the fourth handle retainer in the retracted position, wherein four grasping areas defined by the first grasping portion, the second grasping portion, the third grasping portion, and the fourth grasping portion are available when the first handle and the second handle are in the retracted position, wherein the first grasping portion and the third grasping portion are outwardly extended from the first handle retainer and the second handle retainer, respectively, when the first handle and the second handle are in the extended position, and wherein the second grasping portion and the fourth grasping portion are inwardly disposed closer to the first handle retainer and the second handle retainer, respectively, in the extended position.

11. A method for transferring cargo in relation to a cargo compartment of a vehicle, the method comprising:
positioning a retaining pan of a frame underneath the cargo;
retaining cargo on a cargo-retaining platform of the frame of a trolley system;
securing the cargo on the cargo-retaining platform with one or more attachments coupled to the frame;
moving one or more handles coupled to the frame between a retracted position and an extended position;
sliding a portion of a lower surface of the frame formed of a low friction material over a floor surface;
upwardly pivoting the trolley system, by the one or more handles in the extended position, so that one or more rollers directly contact a floor; and
rolling the trolley system via one or more rollers coupled to the frame.

12. The method of claim 11, wherein said moving comprises outwardly extending a first grasping portion and a second grasping portion of the one or more handles from the frame when the handles are in the retracted position.

13. The method of claim 11, wherein lower surfaces of the one or more rollers are within a plane that is above or coplanar with the lower surface of the frame.

14. The method of claim 11, wherein the trolley system is upwardly pivoted via the one or more handles in the extended position about an axis of the one or more rollers so that the one or more rollers directly contact the floor and allow the trolley system to be rolled via the one or more rollers.

15. The method of claim 11, wherein the frame comprises low friction pads that are formed of the low friction material.

16. The method of claim 11, wherein the frame comprises a chamfered first lower edge at a first end, and a chamfered second lower edge at a second end that is opposite from the first end.

17. The method of claim 11, wherein the one or more attachments comprises one or more straps.

18. The method of claim 11, wherein the frame comprises:
a first handle retainer at a first side and first end;
a second handle retainer at a second side and the first end, wherein the second side is opposite from the first side;
a third handle retainer at the first side and a second end, wherein the second end is opposite from the first end, wherein the first handle retainer is spaced apart from and coaxial with the third handle retainer; and
a fourth handle retainer at the send side and the second end, wherein the second handle retainer is spaced apart from and coaxial with the fourth handle retainer;
wherein the trolley system further comprises:
a first handle moveably retained by the first handle retainer and the third handle retainer of the frame, wherein the first handle comprises a first grasping portion and a second grasping portion opposite from the first grasping portion; and
a second handle moveably retained by the second handle retainer and the fourth handle retainer of the frame, wherein the second handle comprises a third grasping portion and a fourth grasping portion opposite from the third grasping portion, wherein each of the first handle and the second handle is configured to be moved between a retracted position and an extended position, wherein the first grasping portion extends outwardly from the first handle retainer in the retracted position, wherein the second grasping portion extends outwardly from the third handle retainer in the retracted position, wherein the third grasping portion extends outwardly from the second handle retainer in the retracted position, and wherein the fourth grasping portion extends outwardly from the fourth handle retainer in the retracted position, wherein four grasping areas defined by the first grasping portion, the second grasping portion, the third grasping portion, and the fourth grasping portion are available when the first handle and the second handle are in the retracted position, wherein the first grasping portion and the third grasping portion are outwardly extended from the first handle retainer and the second handle retainer, respectively, when the first handle and the second handle are in the extended position, and wherein the second grasping portion and the fourth grasping portion are inwardly disposed closer to the first handle retainer and the second handle retainer, respectively, in the extended position.

19. A method for transferring cargo in relation to a cargo compartment of a vehicle, the method comprising:
positioning a retaining pan of a frame underneath the cargo, wherein the frame comprises: (i) low friction pads that are formed of a low friction material, (ii) a chamfered first lower edge at a first end, and (iii) a chamfered second lower edge at a second end that is opposite from the first end;
retaining cargo on a cargo-retaining platform of the frame of a trolley system;
securing the cargo on the cargo-retaining platform with one or more attachments coupled to the frame, wherein the one or more attachments comprises one or more straps;
moving one or more handles coupled to the frame between a retracted position and an extended position, wherein said moving comprises outwardly extending a first grasping portion and a second grasping portion of the one or more handles from the frame when the handles are in the retracted position;
sliding a portion of a lower surface of the frame formed of the low friction material over a floor surface;
upwardly pivoting the trolley system, by the one or more handles in the extended position, so that one or more rollers directly contact a floor, wherein lower surfaces of the one or more rollers are within a plane that is above or coplanar with the lower surface of the frame, and wherein the trolley system is upwardly pivoted via the one or more handles in the extended position about an axis of the one or more rollers so that the one or more rollers directly contact the floor and allow the trolley system to be rolled via the one or more rollers; and rolling the trolley system via one or more rollers coupled to the frame.

20. A method for transferring cargo in relation to a cargo compartment of a vehicle, the method comprising:

retaining cargo on a cargo-retaining platform of a frame of a trolley system, wherein the frame comprises low friction pads that are formed of a low friction material;

securing the cargo on the cargo-retaining platform with one or more attachments coupled to the frame;

moving one or more handles coupled to the frame between a retracted position and an extended position; and sliding a portion of a lower surface of the frame formed of the low friction material over a floor surface.

* * * * *